(12) United States Patent
Enders

(10) Patent No.: US 11,163,467 B2
(45) Date of Patent: Nov. 2, 2021

(54) SYSTEM AND METHODS FOR OPPORTUNISTIC MIGRATION OF DIGITAL ASSETS

(71) Applicant: Dell Products L.P., Round Rock, TX (US)

(72) Inventor: Kevin Enders, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 16/266,688

(22) Filed: Feb. 4, 2019

(65) Prior Publication Data

US 2020/0249859 A1 Aug. 6, 2020

(51) Int. Cl.
*G06F 12/00* (2006.01)
*G06F 3/06* (2006.01)
*G06F 16/11* (2019.01)

(52) U.S. Cl.
CPC .......... *G06F 3/0638* (2013.01); *G06F 3/0605* (2013.01); *G06F 3/0647* (2013.01); *G06F 16/119* (2019.01)

(58) Field of Classification Search
CPC .... G06F 3/0638; G06F 16/119; G06F 3/0647; G06F 3/0605
USPC ........................................................ 711/165
See application file for complete search history.

(56) References Cited

U.S. PATENT DOCUMENTS

| | | | |
|---|---|---|---|
| 5,602,994 A * | 2/1997 | Ferron | G06F 13/4018 710/66 |
| 9,749,374 B2 | 8/2017 | O'Connor et al. | |
| 2015/0281110 A1* | 10/2015 | Chow | H04L 47/70 709/226 |
| 2019/0057010 A1* | 2/2019 | Kurian | G06F 11/004 |
| 2019/0317826 A1* | 10/2019 | Jain | G06F 9/5077 |

* cited by examiner

*Primary Examiner* — Mardochee Chery
(74) *Attorney, Agent, or Firm* — Jackson Walker L.L.P.

(57) ABSTRACT

An information handling system for migrating digital assets may include a storage medium configured to store information regarding digital assets to be migrated from a source system to a target system and a processor configured to determine a size of a digital asset to be migrated from the source system to the target system and select a mode of data transfer from the source system to the target system for the digital asset based on the size of the digital asset.

6 Claims, 10 Drawing Sheets

FIG. 4A

| MODEL NUMBER 304 | SERIAL NUMBER 306 | FACTORY ID 308 | MANUFACTURE DATE 310 | ORIGINAL MOTHERBOARD ID 314 | PROCESSOR ID 316 | HARD DRIVE ID 318 | ... |
|---|---|---|---|---|---|---|---|
| SA310J43 | SEM5239923875 | AUS | 111909 | 19374WS238017BH | 92348430-432919237 | L83747HJ3672 | |

⟵ UNIQUE SYSTEM COMPONENT IDENTIFIERS ⟶ 302

SA310J43SEM5239923875AUS11190919374WS238017BH92348430-432919237L83747HJ3672

320
ORIGINAL UNIQUE SYSTEM IDENTIFIER

↕ 330
ENTITLEMENT

DIGITAL ASSETS 332

FIG. 4B

| MODEL NUMBER 304 | SERIAL NUMBER 306 | FACTORY ID 308 | MANUFACTURE DATE 310 | NEW MOTHERBOARD ID 334 | PROCESSOR ID 316 | HARD DRIVE ID 318 | ... |
|---|---|---|---|---|---|---|---|
| SA310J43 | SEM5239923875 | AUS | 111909 | 56812FR853945PL | 92348430-432919237 | L83747HJ3672 | |

⟵ UNIQUE SYSTEM COMPONENT IDENTIFIERS ⟶ 402

SA310J43SEM5239923875AUS11190956812FR853945PL92348430-432919237L83747HJ3672

420
NEW UNIQUE SYSTEM IDENTIFIER

↕ 430
ENTITLEMENT

DIGITAL ASSETS 332

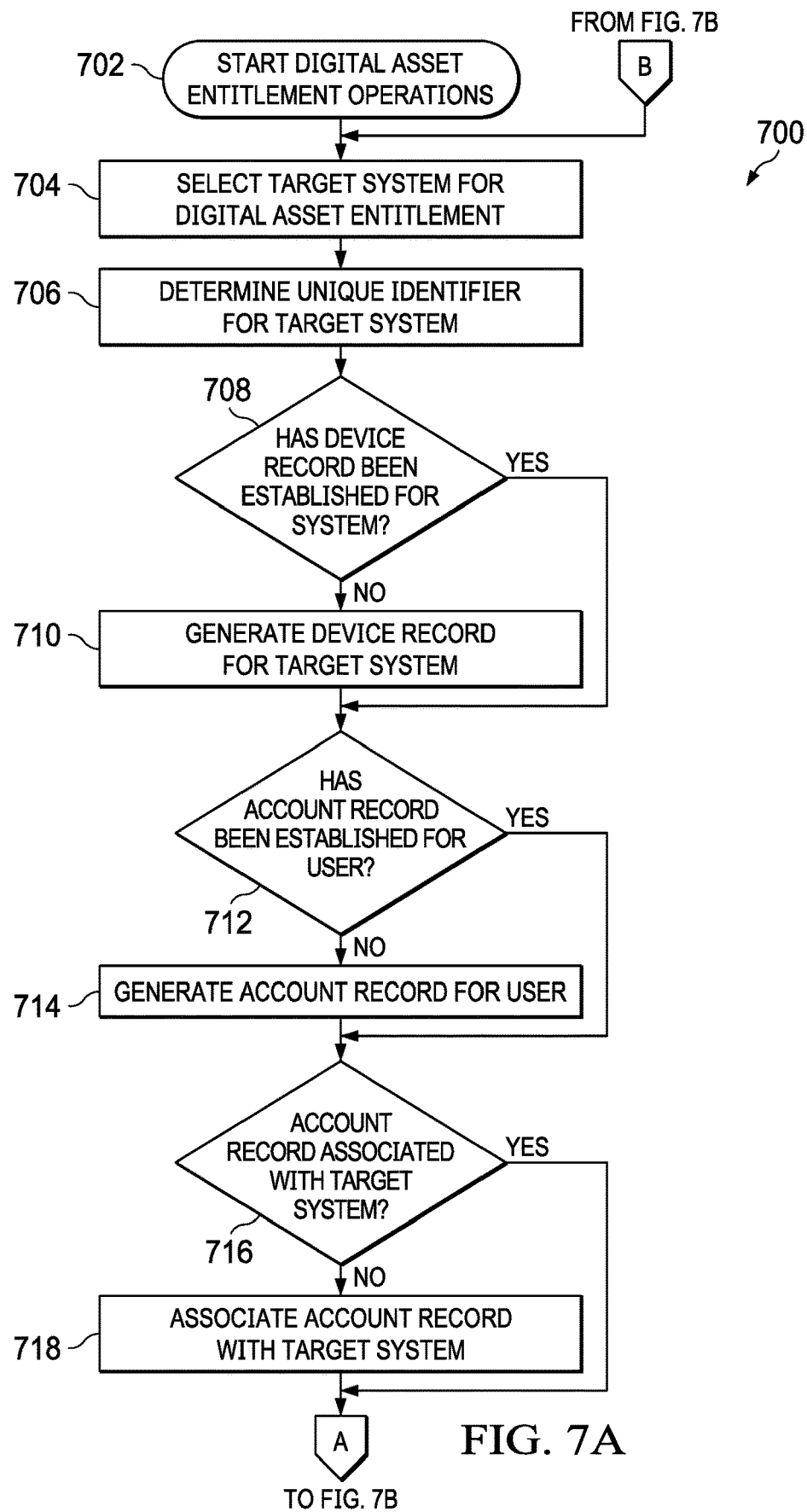

SYSTEM AND METHODS FOR OPPORTUNISTIC MIGRATION OF DIGITAL ASSETS

TECHNICAL FIELD

The present disclosure relates to the management of information handling systems. More specifically, embodiments of the disclosure provide a system, method, and article of manufacture for opportunistically migrating entitled digital assets from a source system to a target system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In recent years, it has become common for manufacturers to offer purchasers the ability to order a system custom-configured to purchaser specification. These custom-configured systems, which are often ordered online, allow the purchaser to select the operating system (OS) of their choice along with a selection of software and other digital assets to meet their individual needs. In some cases, the manufacturer may preinstall the OS and the selected digital assets on the system prior to delivery. In addition, the system may be further personalized (e.g., desktop themes and colors, etc.) as a service to the customer. Such customizations and personalizations may be limited only by the customer's patience and willingness to define or describe their ideal system.

However, there is currently no easy way for the purchaser to migrate software and other digital assets from an existing system to a newly purchased system. As a result, the customer has to locate the original distribution media and license keys that came with the existing system or were purchased later. In the event of downloaded digital assets, the purchaser typically has to find back-up copies of the original downloaded files and emails that include the associated license keys. If they are not located, or if they were lost due to a system failure such as, for example, a crashed hard drive, the purchaser has to log-on to the digital assets provider site, download the files again, and then perform an authentication routine to receive the license keys via email. Moreover, it is not uncommon for users to misplace or forget their User IDs and passwords. While methods exist to recover a log-in name and password, the process is inherently cumbersome, which may further delay the user's recovery of the digital assets. As a result, these issues may either lengthen the time required to replace an existing system or cause system owners to consider alternatives, such as thin client approaches (e.g., netbooks), cloud-based computing, or alternative operating systems. In view of the foregoing, there is a need for more easily migrating digital assets from an existing system to a new system without requiring the user to provide installation files and associated license keys.

Further complicating migrations of software and other digital assets from a source system to a target system is that despite advancements in usage of a network cloud to configure information handling systems and some software providers dictating changes to the way information handling systems are deployed, the link to transfer migration data is often dependent on reliable internet connectivity. Unfortunately, many field configurations and deployments involve environments with inconsistent and unreliable internet connections, thus, making on-premise, system-to-system migrations still quite necessary. Accordingly, systems and methods are desired for making system-to-system migrations more efficient and less time-consuming.

SUMMARY

In accordance with the teachings of the present disclosure, the disadvantages and problems associated with migration of digital assets have been substantially reduced or eliminated.

In accordance with embodiments of the present disclosure, an information handling system for migrating digital assets may include a storage medium configured to store information regarding digital assets to be migrated from a source system to a target system and a processor configured to determine a size of a digital asset to be migrated from the source system to the target system and select a mode of data transfer from the source system to the target system for the digital asset based on the size of the digital asset.

In accordance with these and other embodiments of the present disclosure, a computer-implemented method for opportunistic migration of digital assets may include determining a size of a digital asset to be migrated from a source system to a target system and selecting a mode of data transfer from the source system to the target system for the digital asset based on the size of the digital asset.

In accordance with these and other embodiments of the present disclosure, an article of manufacture may include a computer readable medium and computer-executable instructions carried on the computer readable medium, the instructions readable by a processor, the instructions, when read and executed, for causing the processor to determine a size of a digital asset to be migrated from a source system to a target system and select a mode of data transfer from the source system to the target system for the digital asset based on the size of the digital asset.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein:

FIGS. 4A-B illustrate block diagrams of an example unique system identifier that is changed when one of its associated system component identifiers has been changed, in accordance with embodiments of the present disclosure;

FIGS. 7A-B illustrate a flow chart of an example method for performance of digital asset entitlement operations, in accordance with embodiments of the present disclosure;

DETAILED DESCRIPTION

Preferred embodiments and their advantages are best understood by reference to FIGS. 1-9, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display.

The information handling system may also include one or more buses operable to transmit communication between the various hardware components.

Figure 1:
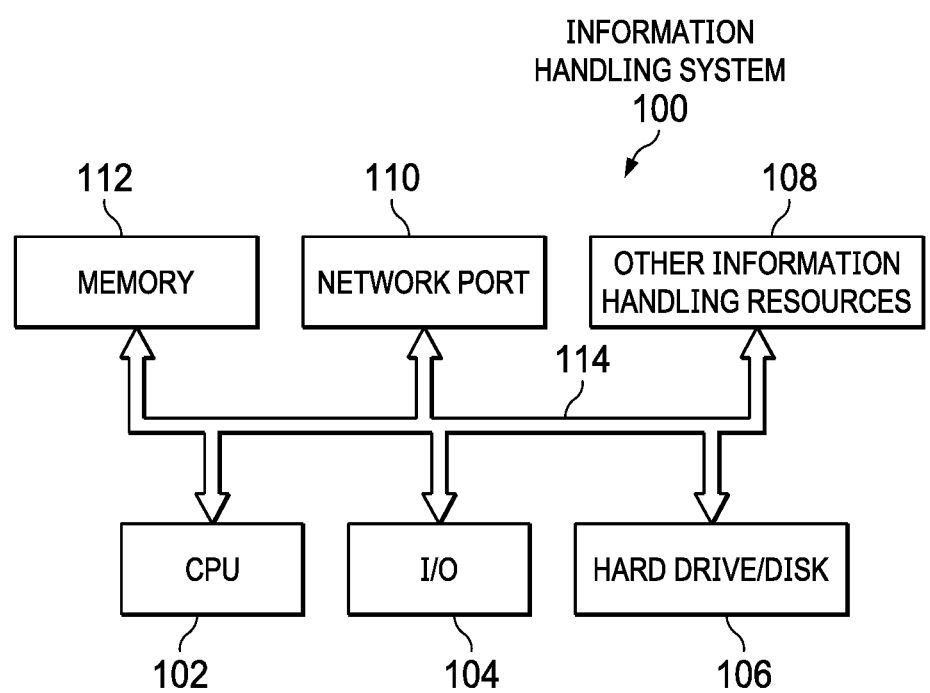
FIG. 1 illustrates a block diagram of an example information handling system, in accordance with embodiments of the present disclosure.

FIG. 1 illustrates a block diagram of an example information handling system 100, in accordance with embodiments of the present disclosure. Information handling system 100 may include a CPU processor 102, I/O devices 104, a hard drive or disk storage 106, a network port 110, a memory 112, and various other information handling resources 108, all communicatively coupled to each other via one or more buses 114. In some embodiments an information handling system identification similar to that depicted in FIG. 1 may be used to implement one or more methods and/or systems disclosed herein.

A processor 102 may include any system, device, or apparatus configured to interpret and/or execute program instructions and/or process data, and may include, without limitation a microprocessor, microcontroller, digital signal processor (DSP), application specific integrated circuit (ASIC), or any other digital or analog circuitry configured to interpret and/or execute program instructions and/or process data. In some embodiments, processor 102 may interpret and/or execute program instructions and/or process data stored in memory 112, hard drive 106, and/or another component of system 100.

An I/O device 104 may include any system, device, or apparatus from which processor 102 may receive input or to which processor 102 may deliver output. An I/O device may include a display, a keyboard, a mouse, other I/O devices, and/or associated controllers.

Hard drive 106 may include computer-readable media (e.g., magnetic storage media, optical storage media, opto-magnetic storage media, and/or other type of rotating storage media, flash memory, and/or other type of solid state storage media) and may be generally operable to store data and/or programs (e.g., one or more operating systems and/or one or more application programs). Although FIG. 1 depicts information handling system 100 as including one hard drive 106, information handling system 100 may include any suitable number of hard drives 106.

Network port 110 may include any suitable system, apparatus, or device operable to serve as an interface between information handling system 100 and a network. Network port 110 may enable information handling system 102 to communicate over such network using any suitable transmission protocol and/or standard, including without limitation Fibre Channel, Frame Relay, Asynchronous Transfer Mode (ATM), Internet Protocol (IP), other packet-based protocol, small computer system interface (SCSI), Internet SCSI (iSCSI), Serial Attached SCSI (SAS) or any other transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof.

Memory 112 may be communicatively coupled to processor 102 and may include any system, device, or apparatus configured to retain program instructions and/or data for a period of time (e.g., computer-readable media). Memory 112 may include random access memory (RAM), electrically erasable programmable read-only memory (EEPROM), a Personal Computer Memory Card International Association (PCMCIA) card, flash memory, magnetic storage, opto-magnetic storage, or any suitable selection and/or array of volatile or non-volatile memory that retains data after power to information handling system 100 is turned off. Although FIG. 1 depicts information handling system 100 as including one memory 112, information handling system 100 may include any suitable number of memories 112.

Other information handling resources 108 may include any component systems, devices, or apparatuses of an information handling system 100, including without limitation processors, buses, memories, I/O devices and/or interfaces, storage resources, network interfaces, motherboards, electro-mechanical devices (e.g., fans), displays, and power supplies.

The one or more buses 114 may comprise any suitable collection of systems, devices, or apparatuses configured to transfer data between various components of information handling system 100. For example, one or more buses 114 may include a serial advanced technology attachment (SATA) bus, a Peripheral Component Interconnect (PCI)/PCMCIA bus, Universal Serial Bus (USB), an SCSI bus, FireWire (IEEE 1394) bus, InfiniBand bus, any other suitable bus, or any combination of the foregoing.

Figure 2:
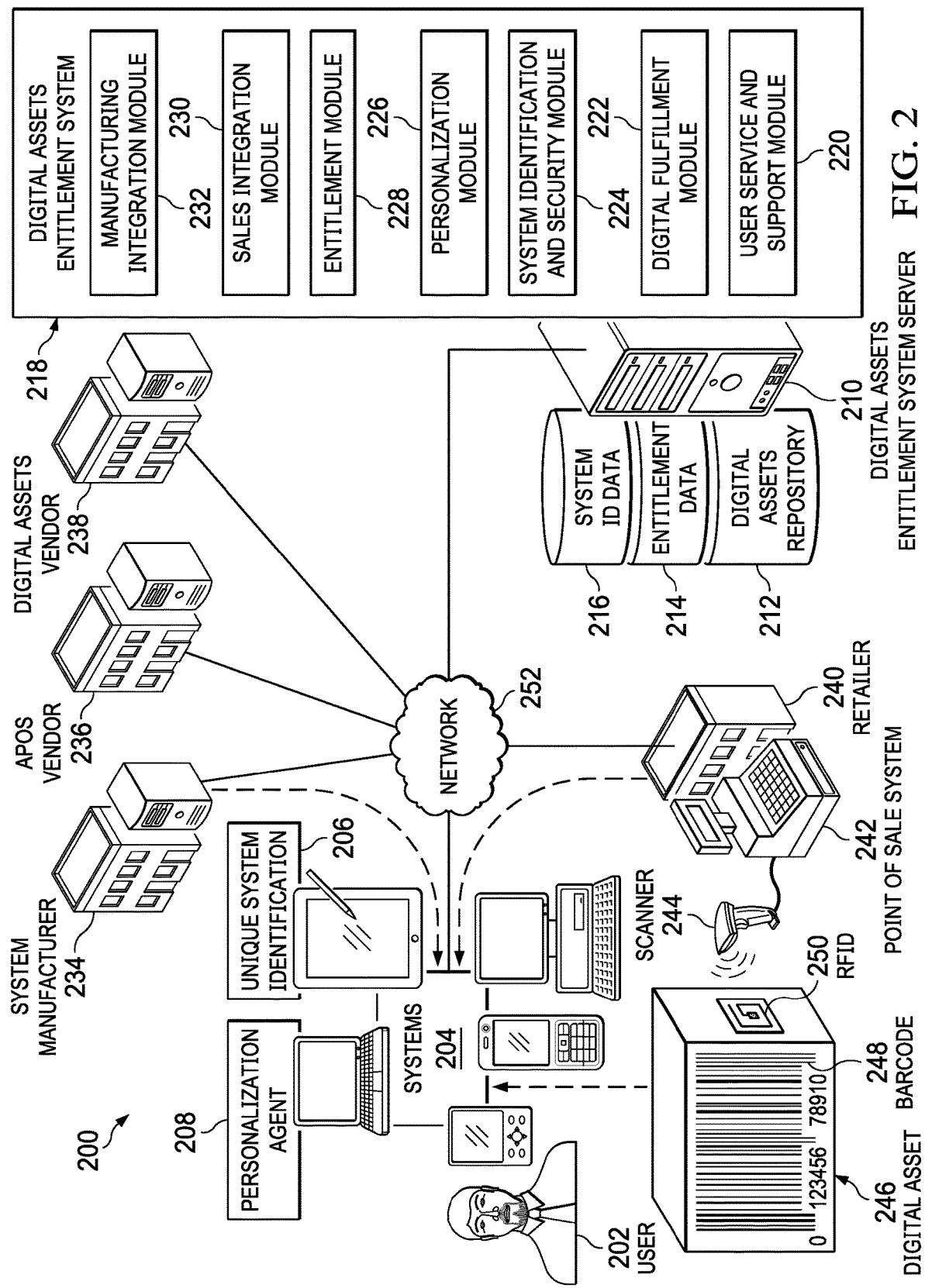
FIG. 2 illustrates a block diagram of an example digital assets entitlement system in accordance with components of the present disclosure.

FIG. 2 illustrates a block diagram of an example digital assets entitlement system 218, in accordance with embodiments of the present disclosure. In some embodiments, digital assets entitlement system 218 may be implemented for managing the entitlement of a system 204 to process a digital asset 246. In these and other embodiments, digital assets entitlement system 218 may be implemented on one or more servers 210, which may be commercially coupled to a network 252. In various embodiments, network 252 may comprise a public network, for example the Internet, a physical private network, a virtual private network (VPN), or any combination thereof. As shown in FIG. 2, digital assets entitlement system 218 may include a user service and support module 220, a digital fulfillment module 222, and a system identification and security module 224. Digital assets entitlement system 218 may likewise comprise a personalization module 226, an entitlement module 228, a sales integration module 230, and a manufacturing integration module 232. In addition, digital assets entitlement system 218 may be configured to access a digital assets data repository 212, an entitlement data repository 214, and a system identifier (ID) data repository 216, each of which may be implemented on one or more servers 210 communicatively coupled to network 252.

As used herein, a digital asset 246 refers to any digital asset, for example, a software application, a deliverable or performable service, music, video, software activation key, personalization instructions, files, etc. that are digitally deliverable either wholly or partially. As likewise used herein, a digital assets entitlement may refer to the association of a predetermined digital asset 246 with a target system 204. In various embodiments, an entitlement record may include the digital assets entitlement data (e.g., license information, etc.) that allows digital asset 246 to be processed by a target system 204 identified by a corresponding unique system identifier 206. In these and other embodiments, the entitlement record may be processed by entitlement module 228 and stored in entitlement data repository 214. Likewise, as used herein, a system 204 may comprise an information handling system (e.g., a personal computer, a laptop computer, a tablet computer, a PDA, a mobile telephone, or any other suitable device) operable to store a unique system ID 206, perform digital asset entitlement operations with a personalization agent, and operable to establish an online session with digital assets entitlement system 218 via network 252.

In some embodiments, digital assets entitlement and system personalization operations may be performed by a user 202, in either a physical environment or an online environment. A user 202 may comprise a system purchaser, enterprise administrator, information technologist, or another suitable person. As an example, a physical environment may comprise a retailer 240 operating a physical point-of-sale (POS) system 242. As another example, an online environment may comprise a system manufacturer 234, after-point-of-sale (APOS) vendor 236, or digital assets vendor 238, that respectively accepts online orders for systems or digital assets via network 252.

If the digital assets entitlement and system personalization operations are performed in an online environment, then user 202 may decide whether to purchase a custom-configured or pre-configured system 204. If the system 204 is to be pre-configured, then it may be selected for online purchase by the user 202 and its unique system identifier 206 may be determined. In some embodiments, the unique system identifier 206 may be stored in the basic input/output system (BIOS) of the pre-configured system 204. However, if the system 204 is to be custom-configured, then it may be custom-configured for online purchase by user 202. Once manufactured by system manufacturer 234, a unique system identifier may be generated as described in greater detail herein.

In various embodiments, manufacturing integration module 232 may coordinate the custom configuration of the system 204 with digital assets entitlement system 218. Likewise, system identification and security module 224 may coordinate the generation of unique system identifier 206 and its storage in the repository of system identifier data 216. User 202 may then select a digital asset 246 for online purchase, followed by selecting personalization options for the pre-configured or custom-configured system 204. In various embodiments, the personalization module 226 coordinates the selection of personalization options with digital assets entitlement system 218. As used herein, a system personalization option refers to any feature, capability, or function that may be applied to a target system 204. As an example, a personal computer desktop wallpaper or user interface options (e.g., a "classic" interface) are personalization options.

However, if the digital assets entitlement and system personalization operations are performed in a physical environment, then user 202 may select a pre-configured system 204 and physical representations of digital assets 246 to be purchased. In various embodiments, the digital asset 246 may be physically represented as images and/or text on a card or a package, yet the digital assets themselves may not be included within the card or package. User 202 may then select system personalization options for the pre-configured system 204. In various embodiments, the system personalization options may likewise be physically represented as images and/or text on a card or a package.

The digital assets product identifier (ID) may then be scanned with a scanner 244 from its corresponding physical representation, followed by scanning its corresponding digital assets activation key or other entitlement data. In various embodiments, it is not necessary to scan the digital assets activation key or other entitlement data as it is provided by digital assets entitlement system 218 during digital asset entitlement operations described in greater detail herein. Data related to the previously selected personalization options may then likewise be scanned, followed by determining unique system identifier 206 of pre-configured system 204. In various embodiments, the digital assets product ID, its associated activation key or entitlement data, the personalization option data, and the unique system identifier may be represented by a bar code 248 or other indicia on a card or physical package. In various other embodiments, the digital assets product ID, its associated activation key or entitlement data, the personalization option data, and the unique system identifier may be stored in a radio frequency identifier (RFID) 250 tag affixed to the physical representation of the digital asset. Those of skill in the art may appreciate that many such embodiments are possible and that the foregoing is not intended to limit the spirit, scope, or intent of the disclosure.

A purchase transaction for the custom-configured or pre-configured system 204 and any associated digital assets 246 and personalization options may then be completed. In various embodiments, the processing of the purchase transaction may be performed by the sales integration module 230. In these and other embodiments, the financial proceeds of the purchase transaction may be settled between multiple parties. For example, a system manufacturer 234 may receive a portion of the purchase transaction corresponding to the cost of the system 204. One or more digital assets vendors 238 may likewise receive a proportionate share of the purchase transaction corresponding to the digital asset 246 they respectively provide.

Digital asset entitlement operations, as described in greater detail herein, may then be performed by digital assets entitlement system 218 to bind the digital assets 246, the personalization options, and their respective digital assets entitlement data to unique system identifier 206 of target system 204. The resulting bound data, including data associated with the digital assets (e.g., installation files, etc.) may then be stored in the repository of entitlement data 214 and purchased system 204 may then be delivered to user 202 or another person designated by user 202. In various embodiments, entitlement module 228 may generate, and then process, the digital assets entitlement data, and user service and support module 220 may coordinate the delivery of system 204 to user 202 or another person designated by user 202.

Standard operating system (OS) out-of-the-box-experience (OOBE) or hypervisor boot operations may be performed on the system 204, followed by loading a personalization agent 208. In various embodiments, the personalization agent 208 has a unique identifier that may be associated with one or more unique system component identifiers. In some embodiments, the unique identifier of the personalization agent may be uniquely associated with the current unique system identifier 206 associated with the system 204. In other embodiments, a portion of the personalization agent 208 may be delivered to the system 204 in an encrypted form and may then be decrypted prior to being loaded on the system 204. In these embodiments, the primary system identifier (e.g., service tag number, serial number, etc.) may be used as a decryption key to decrypt the personalization agent 208.

In these and other embodiments, secondary system identifiers may be stored on system 204 (e.g., in the BIOS, in flash memory, on a hard disk, etc.) as well as in digital assets entitlement system 218. In these and other embodiments, digital assets entitlement system 218 may use the secondary system identifiers to encrypt a portion of personalization agent 208 before it is downloaded to system 204. Once downloaded, the unencrypted portion of personalization agent 208 may use the secondary system identifiers stored on system 204 to decrypt the encrypted portion of personalization agent 208. In some embodiments, the secondary system identifiers may likewise be encrypted and may first be decrypted before they are used to decrypt the encrypted portion of personalization agent 208. In other embodiments, the secondary system identifiers may be stored in a Trusted Platform Module (TPM). Skilled practitioners of the art may appreciate that many such embodiments are possible and the foregoing is not intended to limit the spirit, scope, or intent of the disclosure.

Personalization agent 208 may query target system 204 for its unique system identifier 206. In various embodiments, unique system identifier 206 associated with system 204 may be stored in the target system's BIOS, flash memory, a hard disk, and/or other memory device. Personalization agent 208 may then automatically establish a communication session with digital assets entitlement system 218 and use unique system identifier 206 to authenticate system 204. Unique system identifier 206 may then be used by the personalization agent 208 to determine entitled digital assets and personalization options corresponding to the unique system identifier 206.

Once determined, the corresponding personalization options and digital assets 246, along with their associated digital assets entitlement data, may be respectively downloaded to target system 204 from the repository of digital assets 212 and the repository of entitlement data 214. In some embodiments, the personalization options and digital assets 246, along with their associated digital assets entitlement data 214, may be downloaded from a single digital assets entitlement system server 210 on network 252. In other embodiments, the personalization options and digital assets 246 may be downloaded from one or more servers 210 on network 252. In yet other embodiments, the personalization options, digital assets 246, and associated digital assets entitlement data 214 may be respectively downloaded from a plurality of servers 210 on network 252. As an example, a first digital asset 246 may be provided by system manufacturer 234 and a second digital asset 246 may be provided by a digital assets vendor 238. Likewise, a plurality of digital assets 246 may be provided by a corresponding plurality of digital asset vendors 238. Skilled practitioners of the art may appreciate that many such embodiments and examples are possible and the foregoing is not intended to limit the spirit, scope, or intent of the disclosure.

In various embodiments, digital assets entitlement system 218 may manage the respective location of the personalization options, digital assets 246, and associated digital assets entitlement data 214 to initiate its provision. Once downloaded, personalization agent 208 may use digital assets entitlement data 214 to install digital assets 246 and personalization options on system 204. Thereafter, user 202 or another person may decide to perform an APOS purchase of digital asset 246. As used herein, an APOS purchase of digital assets may refer to any purchase of digital asset 246 made after the initial online or physical purchase of system 204. In various embodiments, the APOS purchase of a digital asset 246 may be performed in a physical, online, or enterprise point-of-sale environment. If the APOS purchase is performed in an online environment, for example from APOS vendor 236, then user 202 or another person may select a digital asset 246 for online purchase. Personalization agent 208 may then determine unique system identifier 206 of system 204. An APOS purchase transaction may then be performed for purchase of the selected digital asset 246. However, if the APOS purchase is performed in a physical environment, then the user 202 or another person may select a physical representation of a digital asset 246 to be purchased. The digital assets product ID may then be scanned from its corresponding physical representation, followed by scanning its corresponding digital assets activation key or other entitlement data.

Digital asset entitlement operations, as described in greater detail herein, may then be performed by digital assets entitlement system 218 to bind digital assets 246 and their respective digital assets entitlement data 214 associated with the APOS purchase to unique system identifier 206 of target system 204. The resulting bound data, including data associated with the digital assets (e.g., installation files, etc.) may then be stored, as described in greater detail herein, in digital assets entitlement system 218. Personalization agent 208, as likewise described in greater detail herein, then automatically establishes a communicative session with digital assets entitlement system 218, and may download the purchased digital assets 246 and their associated digital assets entitlement data 214. Once downloaded, personalization agent 208 may then use the associated digital assets entitlement data 214 to install the downloaded digital asset 246 on system 204.

Figure 3A:
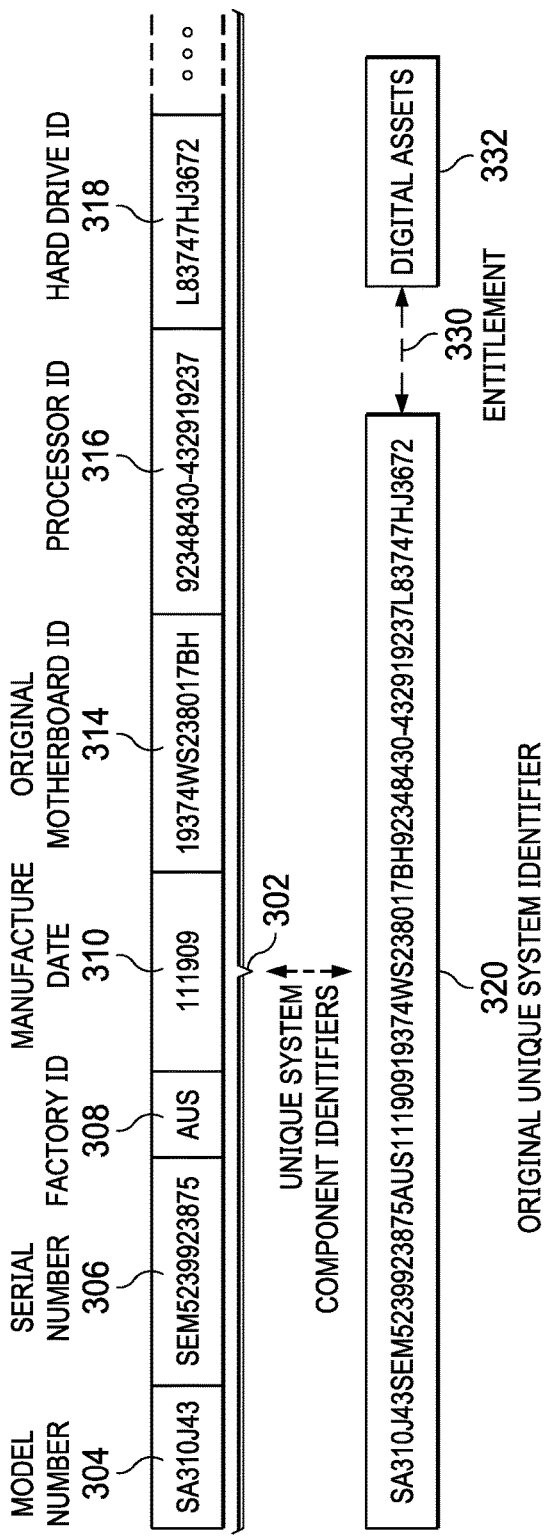
FIGS. 3A-B illustrate block diagrams of an example unique system identifier that remains the same when one of its associated system component identifiers has been changed, in accordance with embodiments of the present disclosure.
Figure 3B:
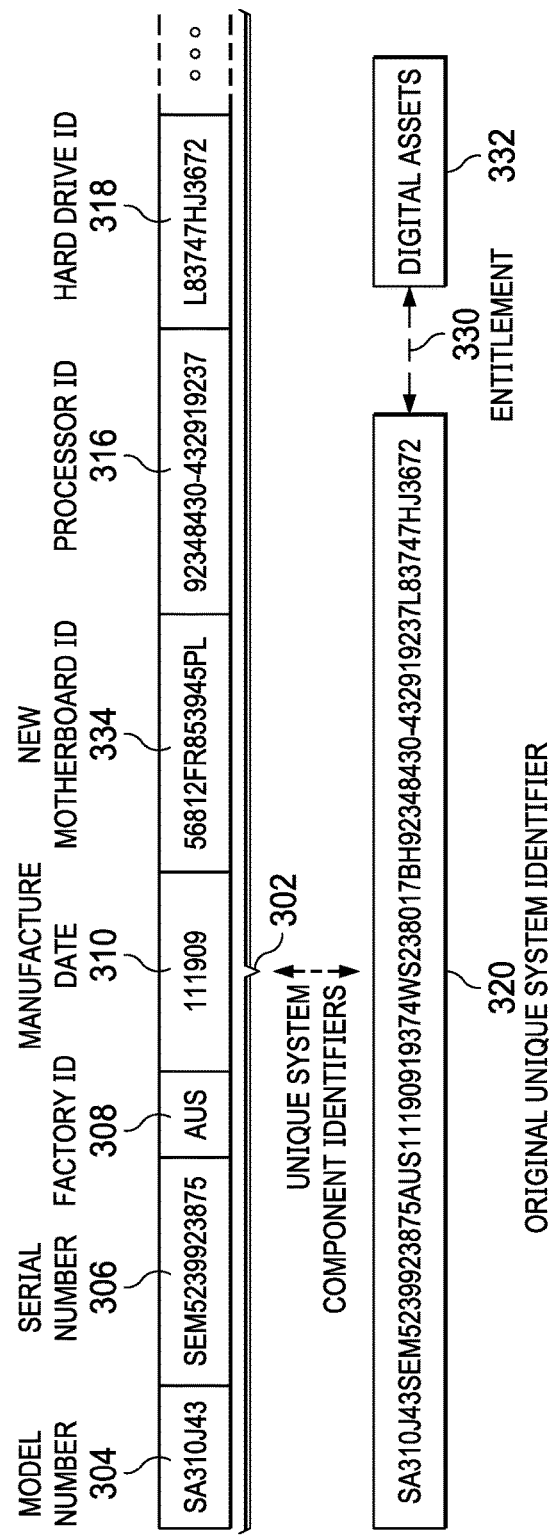

FIGS. 3A-B illustrate a block diagram of an example original unique system identifier 320 that remains the same when one of its associated system component identifiers has been changed, in accordance with embodiments of the present disclosure. As shown in FIG. 3A, an original unique system identifier 320 may be generated from a plurality of unique system component identifiers 302, which correspond to a plurality of system components included in a target system 204. As likewise shown in FIG. 3A, unique system component identifiers 302 may comprise a Model Number 304 'SA310J43', a Serial Number 306, sometimes referred to as a service tag number or a primary system identifier, 'SEM5239923875', a Factory ID 308 'AUS', and a Manufacture Date 310 '111909'. Unique system component identifiers 302 may likewise comprise an Original Motherboard ID 314 '19374WS238017BH', a Processor ID 316 '92348430-432919237', a Hard Drive ID 318 'L83747HJ3672', etc.

As described in greater detail herein, once generated, original unique system identifier 320 may be associated, such as, for example, through a binding operation, with predetermined digital assets 332 to generate a digital assets entitlement 330. As likewise described in greater detail herein, digital assets entitlement 330 entitles a target system 204, which may be associated with the original unique system identifier 320, to process the digital assets 332. However, it is not uncommon for system components to be replaced due to failure, erratic performance, becoming outmoded, or for other reasons. It will be appreciated that the entitlement 330 between original unique system identifier 320 and digital assets 332 may be compromised as a result of such a replacement. For example, as illustrated in FIG. 3B, the Original Motherboard ID 314 '19374WS238017BH' may be replaced with a New Motherboard ID 334 '56812FR853945PL'. However, in such case the original unique system identifier 320 may remain unchanged.

In various embodiments, extract, transform, and load (ETL) and other database operations may be performed to manage the integrity of the relationship between original unique system identifier 320 and the plurality of unique system component identifiers 302. As an example, Original Motherboard ID 314 '19374WS238017BH' may remain as a subset of original unique system identifier 320, even though it may have been deactivated or invalidated as a unique system component identifier 302. However, in these and other embodiments, relational database operations known to those of skill in the art may be applied to maintain the relationship between original unique system identifier 320, New Original Motherboard ID 334 '56812FR853945PL', and unchanged unique system component identifiers 302. Accordingly, the integrity of entitlement 330 between original unique system identifier 320 and digital assets 332 may be perpetuated. It may be appreciated by skilled practitioners of the art that many such embodiments are possible and the foregoing is not intended to limit the spirit, scope, or intent of the disclosure.

FIGS. 4A-B illustrate a block diagram of an example unique system identifier 320 that is changed when one of its associated system component identifiers has been changed, in accordance with embodiments of the present disclosure. As shown in FIG. 4A, an original unique system identifier 320 may be generated from a plurality of unique system component identifiers 302, which correspond to a plurality of system components included in a target system 204. As likewise shown in FIG. 3A, unique system component identifiers 302 may comprise Model Number 304 'SA310J43', Serial Number 306, sometimes referred to as a service tag number or a primary system identifier, 'SEM5239923875', Factory ID 308 'AUS', and Manufacture Date 310 '111909'. Unique system component identifiers 302 may likewise comprise Original Motherboard ID 314 '19374WS238017BH', Processor ID 316 '92348430-432919237', Hard Drive ID 318 183747HJ3672', etc.

As described in greater detail herein, once generated, original unique system identifier 320 may be associated, such as, for example, through a binding operation, with predetermined digital assets 332 to generate a digital assets entitlement 330. As likewise described in greater detail herein, digital assets entitlement 330 entitles a target system 204, which may be associated with original unique system identifier 320, to process digital assets 332. However, it is not uncommon for system components to be replaced due to failure, erratic performance, becoming outmoded, or for other reasons. It will be appreciated that entitlement 330 between the original unique system identifier 320 and digital assets 332 may be compromised as a result of such a replacement. For example, as illustrated in FIG. 4B, Original Motherboard ID 314 '19374WS238017BH' may be replaced with New Motherboard ID 334 '56812FR853945PL'. As result, a new unique system identifier 420 may be generated, which may be a concatenation of the plurality of unique system component identifiers 402, including New Original Motherboard ID 334 '56812FR853945PL' as a subset.

In various embodiments, a first set of operations may be performed to remove entitlement 330 between original unique system identifier 320 and digital assets 332. A second set of operations may then be performed to associate new unique system identifier 420 with digital assets 332 to generate a new entitlement 430. In these and other embodiments, original unique system identifier 320 may then be invalidated. Accordingly, the integrity of original entitlement 330 between original unique system identifier 320 and digital assets 332 may be perpetuated by new entitlement 430 between new unique system identifier 420 and digital assets 332. Skilled practitioners of the art may appreciate that many such embodiments are possible and the foregoing is not intended to limit the spirit, scope, or intent of the disclosure.

Figure 5:
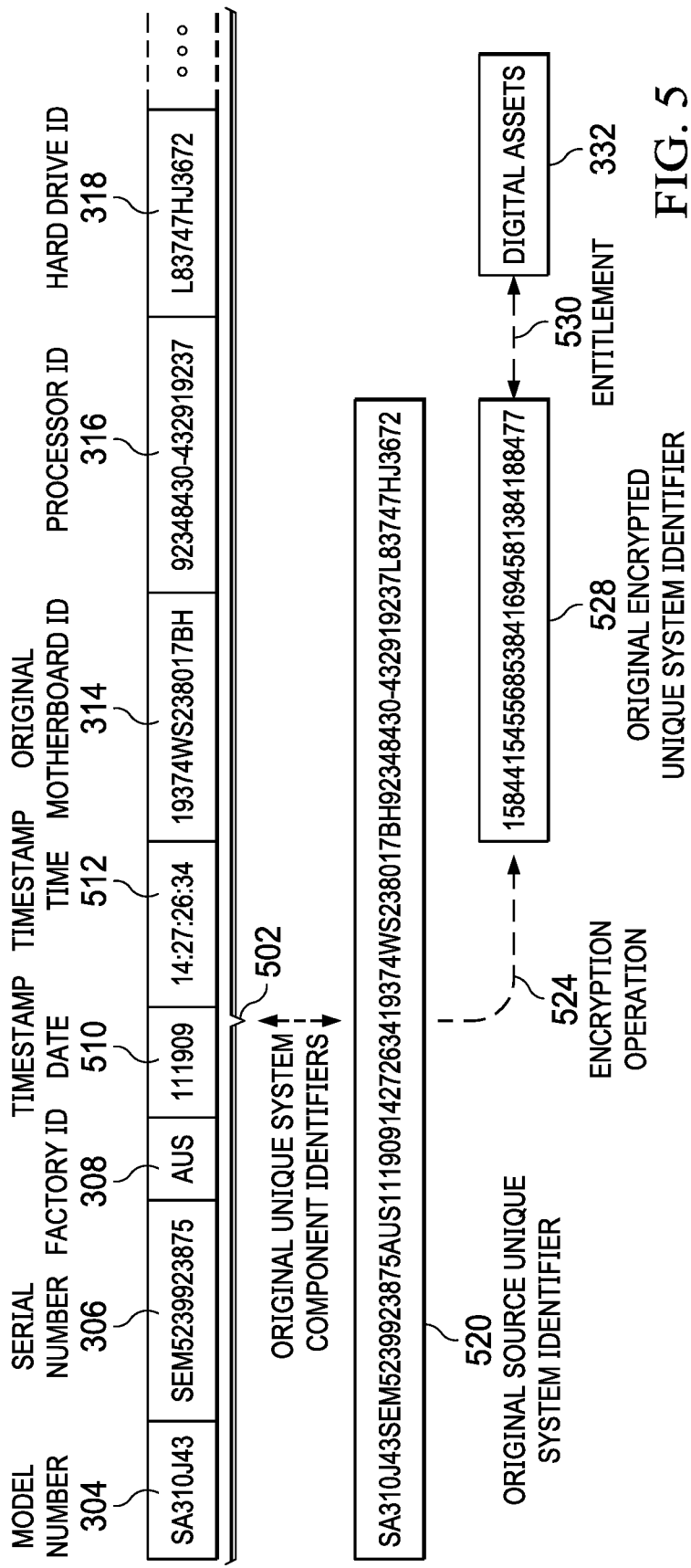
FIG. 5 illustrates a block diagram of an example encrypted unique system identifier generated from a set of system component identifiers, in accordance with embodiments of the present disclosure.

FIG. 5 illustrates a block diagram of an example encrypted unique system identifier 528 generated from a set of system component identifiers, in accordance with embodiments of the present disclosure. In these embodiments, a source unique system identifier 520 may be generated from a plurality of original unique system component identifiers 502, which may correspond to a plurality of system components included in a target system 204. As shown in FIG. 5, original unique system component identifiers 502 may comprise Model Number 304 'SA310J43', Serial Number 306, sometimes referred to as a service tag number or a primary system identifier, 'SEM5239923875', Factory ID 308 'AUS', Timestamp Date 510 '111909', and Timestamp Time 512 '14:27:26:34'. Original unique system component identifiers 502 may likewise comprise Original Motherboard ID 314 '19374WS238017BH', Processor ID 316 '92348430-432919237', Hard Drive ID 318 183747HJ3672', etc.

An encryption operation 524 may then be performed on source unique system identifier 520 to generate original encrypted unique system identifier 528. In various embodiments, the encryption operation may comprise the use of a private key, a public key, key pairs, or any combination of keys and cryptographic operations such as implemented in a public key infrastructure (PKI), for example. As an example, the original encrypted unique system identifier 528 may be generated using a private key associated with the manufacturer of the system and a public key associated with the system itself. In some embodiments, the Timestamp Date 510 '111909' and the Timestamp Time 512 '14:27:26:34' may likewise be used to generate the encrypted unique system identifier 528. Skilled practitioners of the art may be familiar with such cryptographic operations and may appreciate that many such embodiments are possible and that the foregoing is not intended to limit the spirit, scope, or intent of the disclosure.

As described in greater detail herein, once generated, original encrypted unique system identifier 528 may be associated, such as, for example, through a binding operation, with predetermined digital assets 332 to generate a digital assets entitlement 530. As likewise described in greater detail herein, digital assets entitlement 530 may entitle a target system 204, which may be associated with original encrypted unique system identifier 528, to process digital assets 332.

Figure 6:
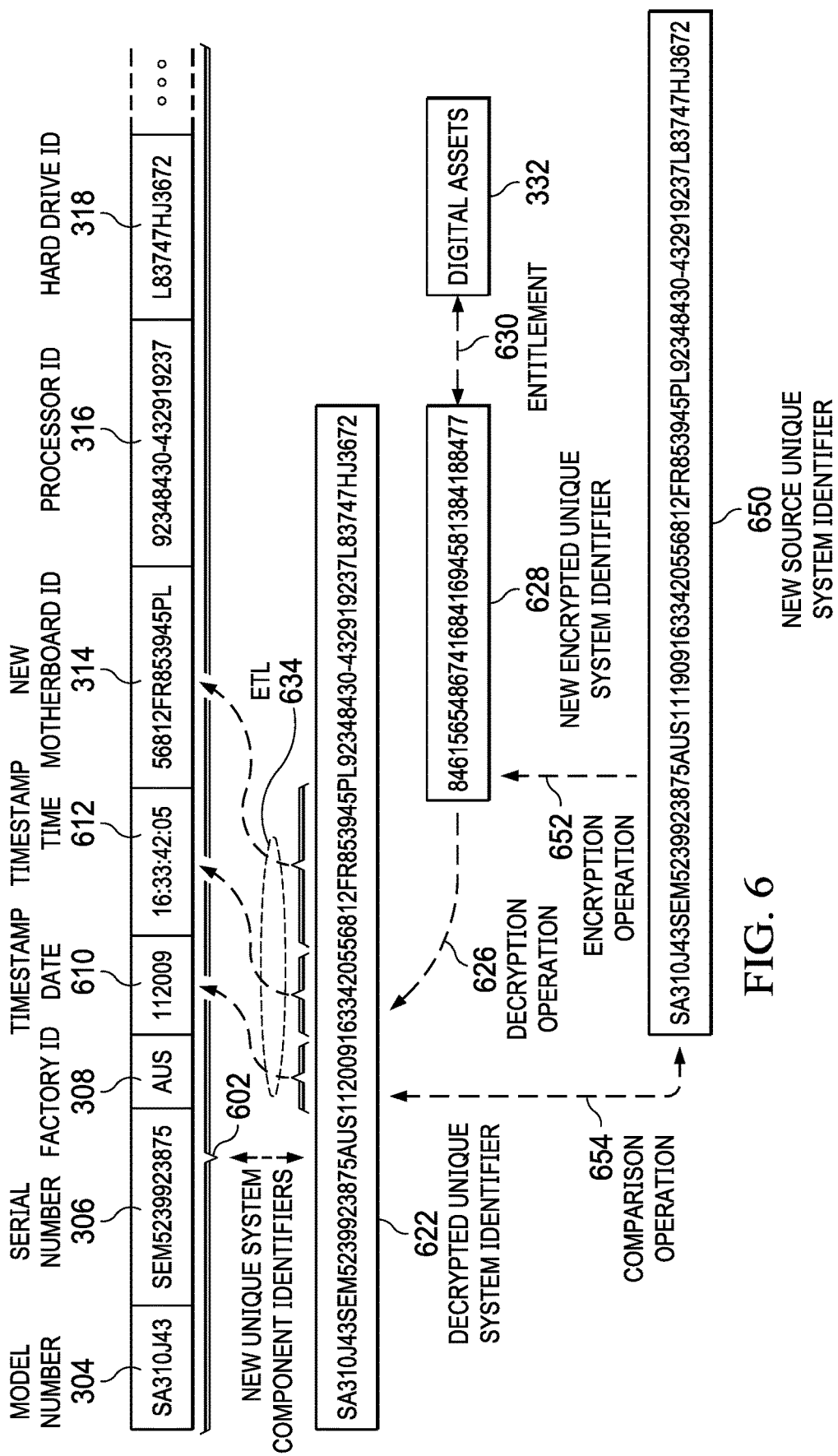
FIG. 6 illustrates a block diagram of an example unique system identifier decrypted from an encrypted unique system identifier, in accordance with embodiments of the present disclosure.

FIG. 6 illustrates a block diagram of an example unique system identifier decrypted from an encrypted unique system identifier 622, in accordance with embodiments of the present disclosure. It is not uncommon for system components to be replaced due to failure, erratic performance, becoming outmoded, or for other reasons. However, the replaced system component will typically have a different unique system component identifier. As a result, the entitlement association between a unique system identifier and predetermined digital assets may be compromised as a result of such a replacement, which in turn may prevent target system 204 from processing the digital assets 246.

In various embodiments, the unique system component identifier of the replacement system component may be unknown until it is replaced in the target system 204. In these and other embodiments, the system component may be replaced in the target system 204, the target system 204 may then be initiated (e.g., booted), and an inventory of unique system component identifiers may be performed. In some embodiments, one or more unique system component identifiers, for example a serial number or service tag, may be visible and may be visually inventoried. In other embodiments, one or more unique system component identifiers, for example a motherboard, processor, or hard drive serial number, may not be visible and may be automatically inventoried.

As shown in FIG. 6, a new source unique system identifier 650 may be generated from the inventoried unique system component identifiers. In some embodiments, a time stamp date and a time stamp time may be components of new source unique system identifier 650. In these embodiments, the time stamp date and a time stamp time may be used to validate the authenticity of new source unique system identifier 650. As an example, the provider of the replacement part may have stipulated that the replacement part be replaced on Nov. 12, 2009, between 8:00 AM and 6:00 PM. Accordingly, a time stamp date of Nov. 12, 2009 and a time stamp time of 16:33:42:05 may provide validation that the replacement part was replaced within the specified date and time interval.

An encryption operation 652 may then be performed on new source unique system identifier 650 to generate a new encrypted unique system identifier 628. As an example, the encryption operation may be performed using a private key associated with the target system and a public key associated with the provider of the replacement system component. The new encrypted unique system identifier 628 may then be communicated to digital assets entitlement system 218, which may in turn perform a decryption operation 626 to generate a decrypted unique system identifier 622.

As likewise shown in FIG. 6, ETL and other database operations 634 may be performed on the decrypted unique system identifier 622 to generate new unique system component identifiers 602. As shown in FIG. 6, the new unique system component identifiers may now comprise Model Number 304 'SA310J43', Serial Number 306, 'SEM5239923875', Factory ID 308 'AUS', Timestamp Date 610 '112009', and Timestamp Time 612 '16:33:42:05'. New unique system component identifiers 602 may likewise comprise New Motherboard ID 314 '56812FR853945PL', Processor ID 316 '92348430-432919237', Hard Drive ID 318 'L83747HJ3672', etc. In some embodiments, Timestamp Date 610 and Timestamp Time 612 may be compared to previously authorized timestamp date and timestamp times to validate the authenticity of new unique system component identifiers 602 and their corresponding decrypted unique system identifier 622. In these and other embodiments, if the decrypted unique system identifier 622 is validated, then a first set of operations may be performed to remove entitlement 330 between the original encrypted unique system identifier and digital assets 332. A second set of operations may then be performed to associate new encrypted unique system identifier 628 with digital assets 332 to generate new entitlement 630. Accordingly, the integrity of the original entitlement between the original encrypted unique system identifier and digital assets 332 may be perpetuated by new entitlement 630 between new encrypted unique system identifier 628 and digital assets 332.

In various other embodiments, the provider of the replacement system component may be able to determine its associated unique system component identifier. In some embodiments, the unique system component identifier may be known in advance. In other embodiments, the unique system component identifier may be one of a pool of, or a range of, possible unique system component identifiers set aside for replacement purposes. As described in greater detail herein, a new source unique identifier may be generated, using the unique system component identifier of the component to be replaced. Once the new source unique identifier is generated, the unique system component identifier of the replaced system component may be invalidated. In these and other embodiments, the system component may be replaced in the target system, the target system may then be initiated (e.g., booted), and an inventory of unique system component identifiers may be performed. In some embodiments, one or more unique system component identifiers, for example a serial number or service tag, may be visible and may be visually inventoried. In other embodiments, one or more unique system component identifiers, for example a motherboard, processor, or hard drive serial number, may not be visible and may be automatically inventoried.

As shown in FIG. 6, a new source unique system identifier 650 may be generated from the inventoried unique system component identifiers. In some embodiments, a time stamp date and a time stamp time may be components of new source unique system identifier 650. In these embodiments, the time stamp date and a time stamp time may be used to validate the authenticity of new source unique system identifier 650. An encryption operation 652 may then be performed on new source unique system identifier 650 to generate new encrypted unique system identifier 628. As an example, the encryption operation may be performed using a private key associated with the target system and a public key associated with the provider of the replacement system component. The new encrypted unique system identifier 628 may then be communicated to a digital assets entitlement system, which in turn may perform a decryption operation 626 to generate a decrypted unique system identifier 622.

Comparison operations 654 may then be performed between the new source unique system identifier and decrypted unique system identifier 622. If comparison operations 654 are successful, then a first set of operations may be performed to remove the entitlement 330 between the original encrypted unique system identifier and digital assets 332. A second set of operations may then be performed to associate new encrypted unique system identifier 628 with digital assets 332 to generate a new entitlement 630. Accordingly, the integrity of the original entitlement between the original encrypted unique system identifier and digital assets 332 may be perpetuated by the new entitlement 630 between the new encrypted unique system identifier 628 and the digital assets 332. Skilled practitioners of the art may appreciate that many such embodiments are possible and the foregoing is not intended to limit the spirit, scope, or intent of the disclosure.

Figure 7B:
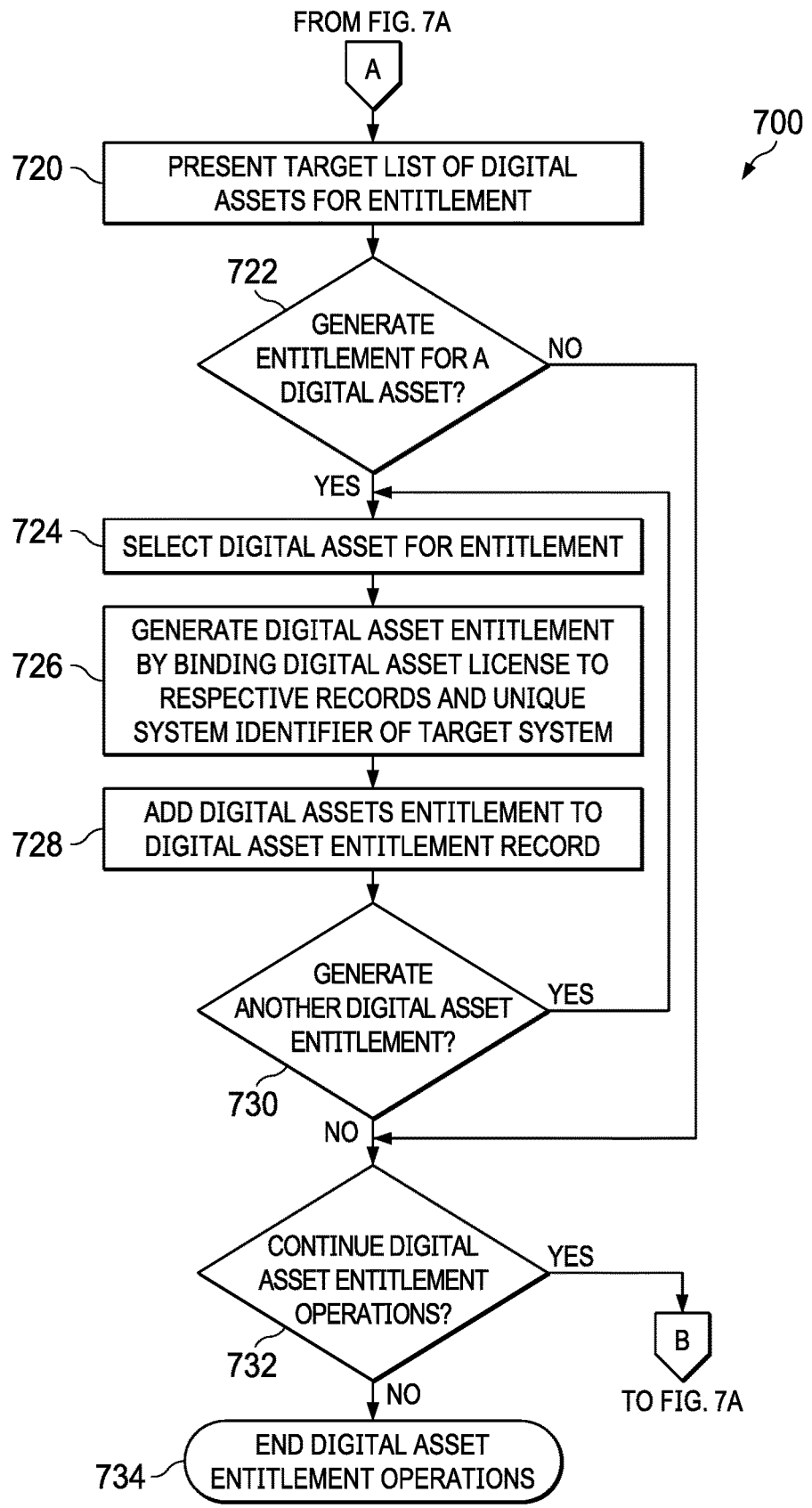

FIGS. 7A-B illustrate a flow chart of an example method 700 for performance of digital asset entitlement operations, in accordance with embodiments of the present disclosure. According to certain embodiments, method 700 may begin at step 702. As noted above, teachings of the present disclosure may be implemented in a variety of configurations of system 200. As such, the preferred initialization point for method 700 and the order of the steps 702-734 comprising method 700 may depend on the implementation chosen.

In method 700, digital asset entitlement operations may be started in step 702, followed by the selection of a target system in step 704 for digital assets entitlement. The unique system identifier of the target system, as described in greater detail herein, may be determined in step 706, followed by a determination being made in step 708 whether a device record has been established for the target system. If not, then the device record may be generated in step 710. As used herein, a device record may refer to a data record comprising data related to a system which will receive an entitlement to process associated digital assets. In various embodiments, the unique system identifier of the target system may be stored in the device record. In various embodiments, other records may be associated with the device record to further describe the system, such as, for example, its model, type, make, internal identifiers, etc.

Once the device record has been generated, or if it is determined in step 708 that it has already been established, then a determination may be made in step 712 whether an account record has been established for a user. If not, then the account record may be generated for the user in step 714. As used herein, an account record may refer to a data record comprising data related to the association of multiple devices or systems to one or more entities. In various embodiments, the entity may be a single individual or a group of individuals. As an example, the entity may be a household with multiple PCs, a small business with several employees, a large corporation with many employees, etc. Other records may be attached to the account to further describe the account holder, payment information related to the account, etc. Accounts may further be broken down or organized into sub-accounts as needed (e.g., to describe departments within an enterprise). In various embodiments, a user may be associated with a single device or system or multiple devices or systems in the account record. Conversely, a group of users may be associated with a single device or system or multiple devices in the account record. Further, more groups of individual users may likewise be associated with groups of individual devices or systems. Those of skill in the art may appreciate that many such associations are possible and the foregoing is not intended to limit the spirit, scope, or intent of the disclosure. Once the account record has been generated, or if it is determined in step 712 that it has already been established, then a determination may be made in step 716 whether the account record may be associated with the target system. If not, then the account record may be associated with the target system in step 718.

Once the account record has been associated with the target system, or if it is determined in step 716 that it has already been associated, then a target list of digital assets may be presented in step 720 for entitlement. A determination may then be made in step 722 whether to generate an entitlement for a digital asset. If not, then a determination may be made in step 732 whether to continue digital asset entitlement operations. If so, then the process may be continued, proceeding with step 704. Otherwise digital asset entitlement operations may be ended in step 734. However, if it is determined in step 722 to generate an entitlement for a digital asset, then a target digital asset may be selected in step 724. A digital assets entitlement may then be generated in step 726 by performing operations to associate the selected digital asset's corresponding license record with the aforementioned device record, account record, and/or other predetermined records. The resulting digital assets entitlement association may then be added to the entitlement record in step 728. A determination may then be made in step 730 whether to generate another digital assets entitlement. If so, the process may be continued, proceeding with step 724. Otherwise, a determination may be made in step 732 whether to continue digital asset entitlement operations. If so, then the process may be continued, proceeding with step 704. Otherwise digital asset entitlement operations may be ended in step 734.

Although FIGS. 7A and 7B disclose a particular number of steps to be taken with respect to method 700, method 700 may be executed with greater or lesser steps than those depicted in FIGS. 7A and 7B. In addition, although FIGS. 7A and 7B disclose a certain order of steps to be taken with respect to method 700, the steps comprising method 700 may be completed in any suitable order.

Method 700 may be implemented using information handling system 100, system 200, components thereof, and/or any other system operable to implement method 700. In certain embodiments, method 700 may be implemented partially or fully in software and/or firmware embodied in computer-readable media.

Figure 8:
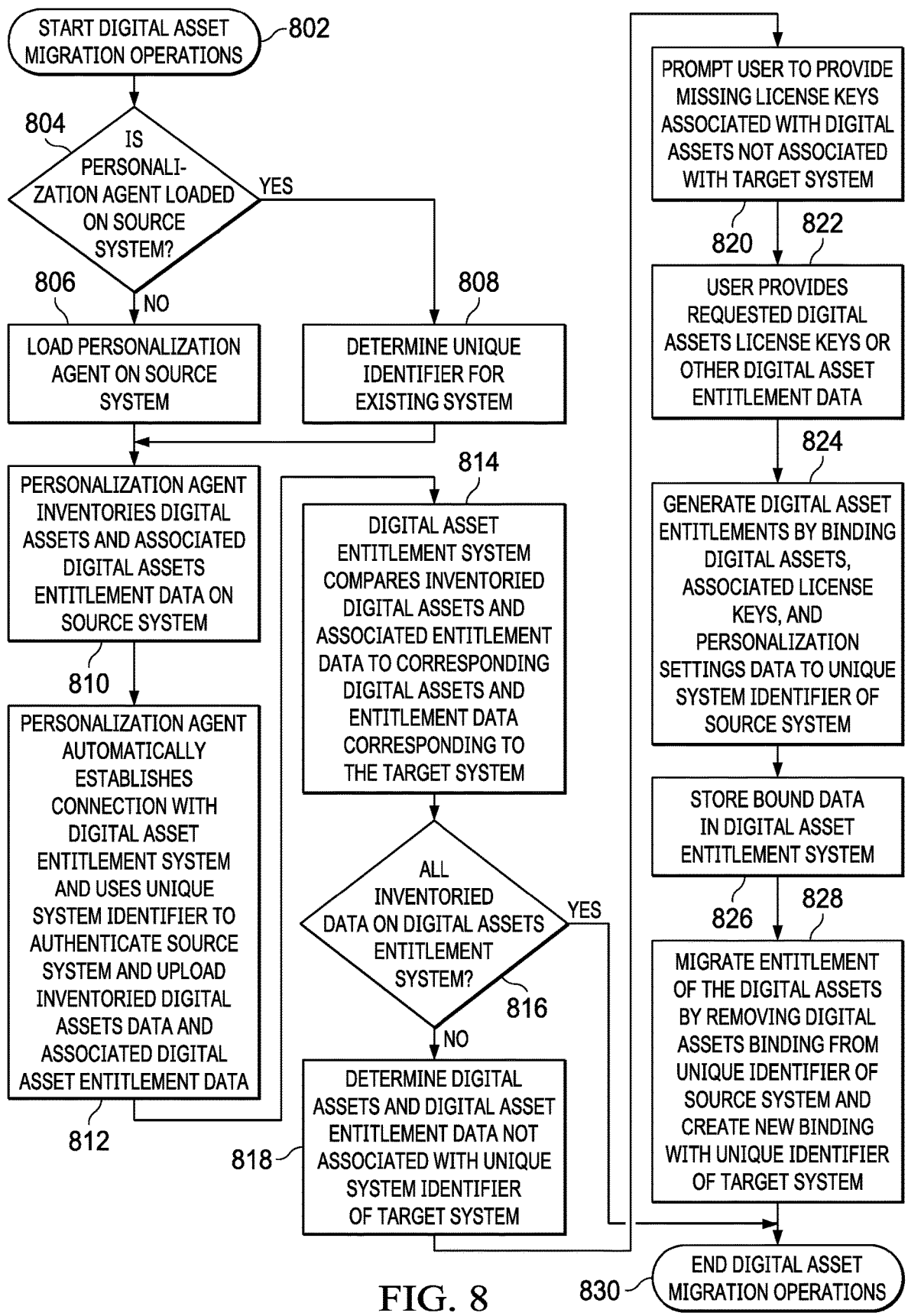
FIG. 8 illustrates a flow chart of an example method for performance of digital assets migration operations, in accordance with embodiments of the present disclosure.

FIG. 8 illustrates a flow chart of an example method 800 for the performance of digital assets migration operations, in accordance with embodiments of the present disclosure. According to certain embodiments, method 800 may begin at step 802. As noted above, teachings of the present disclosure may be implemented in a variety of configurations of system 200. As such, the preferred initialization point for method 800 and the order of the steps 802-830 comprising method 800 may depend on the implementation chosen.

In method 800, digital assets migration operations may begin in step 802. A determination may be made in step 804 whether a personalization agent is loaded on the source system. If it is determined in step 804 that a personalization agent is not loaded on the source system, then it may be loaded in step 806. In either case, the personalization agent may query the target system to determine its unique system identifier in step 808. After the system identifier is determined in step 808, inventory operations may then be performed in step 810 by the personalization agent to inventory digital assets and any associated digital assets entitlement data installed on the source system.

The personalization agent may then automatically establish a communicative session with the digital assets entitlement system in step 812 and use the unique system identifier to authenticate the source system and upload the inventoried digital assets and digital assets entitlement data associated with the source system. The digital assets entitlement system may then perform comparison operations in step 814 between the digital assets and the digital assets entitlement data respectively corresponding to the source system's and the target system's unique system identifiers. A determination may then be made in step 816 if all of the inventoried digital assets and digital assets entitlement data associated with the source system's unique system identifier is now associated with the target system's unique system identifier.

If not, then the digital assets and digital assets entitlement data not associated with the unique system identifier of the target system may be determined in step 818. The user may then be prompted in step 820 to provide any missing license keys, or other digital assets entitlement data, associated with inventoried digital assets that are not currently associated with the target system's unique system identifier. The user may then provide the requested digital assets license keys or other missing digital assets entitlement data to the digital assets entitlement system in step 822.

Digital assets entitlement data may then be generated in step 824 by binding the digital assets and their associated activated activation key or other digital assets entitlement data to the unique system identifier of the source system. The bound data may then be stored in the digital assets entitlement system in step 826. The entitlement of the digital assets is then migrated in step 828 by disassociating their respective digital assets entitlements from the unique system identifier of the source system and then associating it with the unique system identifier of the target system. Then, or if it is determined in step 816 that all inventoried digital assets data and associated digital assets entitlement data is currently on the digital assets entitlement system, digital assets migration operations may end in step 830.

Although FIG. 8 discloses a particular number of steps to be taken with respect to method 800, method 800 may be executed with greater or lesser steps than those depicted in FIG. 8. In addition, although FIG. 8 discloses a certain order of steps to be taken with respect to method 800, the steps comprising method 800 may be completed in any suitable order.

Method 800 may be implemented using information handling system 100, system 200, components thereof, and/or any other system operable to implement method 800. In certain embodiments, method 800 may be implemented partially or fully in software and/or firmware embodied in computer-readable media.

Figure 9:
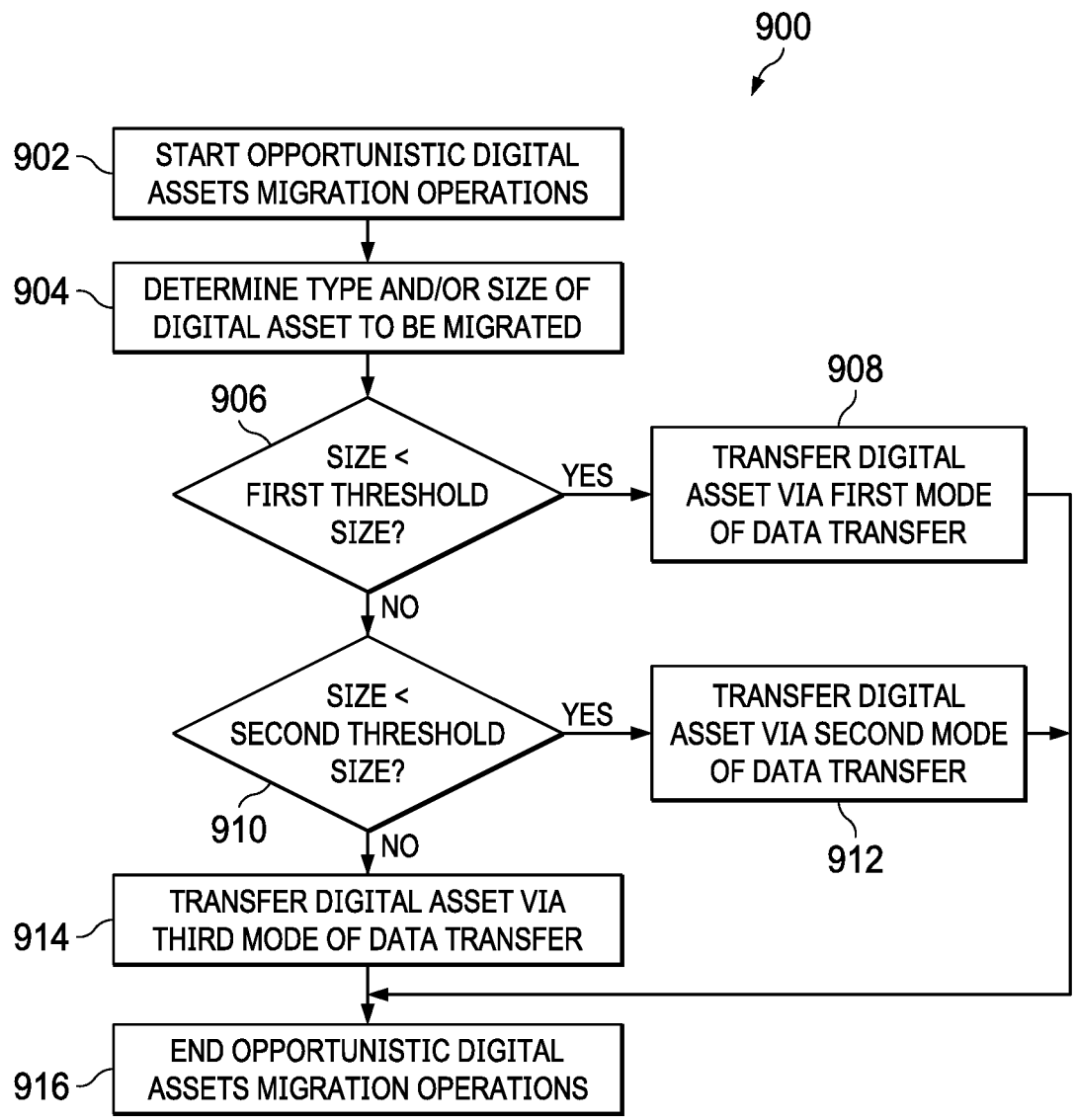
FIG. 9 illustrates a flow chart of an example method for opportunistic migration of digital assets, in accordance with embodiments of the present disclosure.

FIG. 9 illustrates a flow chart of an example method 900 for opportunistic migration of digital assets, in accordance with embodiments of the present disclosure. In accordance with method 900, a file type and/or size and application type and/or size may be identified, and a mode of data transfer may be selected for migration of digital assets from a source information handling system to a target information handling system based on the file type and/or size and/or application type and/or size. A "mode of data transfer" may comprise any mechanism to transfer data between a source information handling system and a target information handling system. Example modes of data transfer include short-range wireless transmissions (e.g., near-field communication and Bluetooth), long-range wireless transmissions (e.g., Wireless Fidelity or "Wi-Fi"), and wired transmissions (e.g., Ethernet).

In some embodiments, one or more portions of method 900 may execute contemporaneously with one or more portions of method 800 described above. According to certain embodiments, method 900 may begin at step 902. As noted above, teachings of the present disclosure may be implemented in a variety of configurations of system 200. As such, the preferred initialization point for method 900 and the order of the steps 902-916 comprising method 900 may depend on the implementation chosen.

In method 900, opportunistic digital assets migration operations may begin in step 902. At step 904, a type and/or size of a digital asset to be migrated from a source information handling system and target information handling system may be determined.

At step 906, it may be determined whether the size of the digital asset to be migrated is below a first threshold size (e.g., 10 megabytes). If the size of the digital asset is below the first threshold size, method 900 may proceed to step 908. Otherwise, method 900 may proceed to step 910.

At step 908, responsive to the size of the digital asset being below the first threshold size, the digital asset may be transferred via a first mode of data transfer. In some embodiments, the first mode of data transfer may comprise data transfer via short-range wireless transmissions (e.g., near-field communication and/or Bluetooth). After completion of step 908, method 900 may proceed to step 916.

At step 910, it may be determined whether the size of the digital asset to be migrated is above the first threshold size and below a second threshold size (e.g., one gigabyte). If the size of the digital asset is above the first threshold size and below the second threshold size, method 900 may proceed to step 912. Otherwise, method 900 may proceed to step 914.

At step 912, responsive to the size of the digital asset being above the first threshold size and below the second threshold size, the digital asset may be transferred via a second mode of data transfer. In some embodiments, the second mode of data transfer may comprise data transfer via long-range wireless transmissions (e.g., Wireless Fidelity or "Wi-Fi"). After completion of step 912, method 900 may proceed to step 916.

At step 914, responsive to the size of the digital asset being above the second threshold size, the digital asset may be transferred via a third mode of data transfer. In some embodiments, the third mode of data transfer may comprise data transfer via long-range wireless transmissions (e.g., Wireless Fidelity or "Wi-Fi"). After completion of step 914, method 900 may proceed to step 916.

At step 916, method 900 may end.

Although FIG. 9 discloses a particular number of steps to be taken with respect to method 900, method 900 may be executed with greater or lesser steps than those depicted in FIG. 9. In addition, although FIG. 9 discloses a certain order of steps to be taken with respect to method 900, the steps comprising method 900 may be completed in any suitable order.

Method 900 may be implemented using information handling system 100, system 200, components thereof, and/or any other system operable to implement method 900. In certain embodiments, method 900 may be implemented partially or fully in software and/or firmware embodied in computer-readable media.

Although method 900 contemplates selection of a mode of data transfer based on a size of a digital asset, in some embodiments, selection of a mode of data transfer may be based on a type of digital asset in addition to or in lieu of selection based on size. For example, in some embodiments, digital assets of a type deemed more critical or of higher priority may be transferred over a particular mode of data transfer while digital assets of a type deemed less critical or of lower priority may be transferred over another mode of data transfer. As another example, digital assets comprising executable applications may be transferred over a particular mode of data transfer while digital assets comprising data may be transferred over another mode of data transfer.

The present disclosure is well adapted to attain the advantages mentioned as well as others inherent therein. While the present disclosure has been depicted, described, and is defined by reference to particular embodiments of the disclosure, such references do not imply a limitation on the disclosure, and no such limitation is to be inferred. The disclosure is capable of considerable modification, alteration, and equivalents in form and function, as will occur to those ordinarily skilled in the pertinent arts. The depicted and described embodiments are examples only, and are not exhaustive of the scope of the disclosure.

For example, the above-discussed embodiments include software modules that perform certain tasks. The software modules discussed herein may include script, batch, or other executable files. The software modules may be stored on a machine-readable or computer-readable storage medium such as, for example, a disk drive. Storage devices used for storing software modules in accordance with embodiments of the disclosure may be magnetic floppy disks, hard disks, or optical discs such as CD-ROMs or CD-Rs, for example. A storage device used for storing firmware or hardware modules in accordance with embodiments of the disclosure may also include a semiconductor-based memory, which may be permanently, removably or remotely coupled to a microprocessor/memory system. Thus, the modules may be stored within a computer system memory to configure the computer system to perform the functions of the module. Other new and various types of computer-readable storage media may be used to store the modules discussed herein. Additionally, those skilled in the art will recognize that the separation of functionality into modules is for illustrative purposes. Alternative embodiments may merge the functionality of multiple modules into a single module or may impose an alternate decomposition of functionality of modules. For example, a software module for calling sub-modules may be decomposed so that each sub-module performs its function and passes control directly to another sub-module.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative. Accordingly, modifications, additions, or omissions may be made to the systems, apparatuses, and methods described herein without departing from the scope of the disclosure. For example, the components of the systems and apparatuses may be integrated or separated. Moreover, the operations of the systems and apparatuses disclosed herein may be performed by more, fewer, or other components and the methods described may include more, fewer, or other steps. Additionally, steps may be performed in any suitable order. As used in this document, "each" refers to each member of a set or each member of a subset of a set.

Although exemplary embodiments are illustrated in the figures and described below, the principles of the present disclosure may be implemented using any number of techniques, whether currently known or not. The present disclosure should in no way be limited to the exemplary implementations and techniques illustrated in the drawings and described above.

Unless otherwise specifically noted, articles depicted in the drawings are not necessarily drawn to scale.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

Although specific advantages have been enumerated above, various embodiments may include some, none, or all of the enumerated advantages. Additionally, other technical advantages may become readily apparent to one of ordinary skill in the art after review of the foregoing figures and description.

To aid the Patent Office and any readers of any patent issued on this application in interpreting the claims appended hereto, applicants wish to note that they do not intend any of the appended claims or claim elements to invoke 35 U.S.C. § 112(f) unless the words "means for" or "step for" are explicitly used in the particular claim.

What is claimed is:

1. An information handling system for migrating digital assets, comprising:
   a storage medium configured to store information regarding digital assets to be migrated from a source system to a target system; and
   a processor configured to:
   determine a size of a digital asset to be migrated from the source system to the target system; and
   select a mode of data transfer from the source system to the target system for the digital asset based on the size of the digital asset, wherein the mode is selected from a plurality of modes, and wherein the mode is selected by:
     selecting a first mode of data transfer if the size is below a first threshold size, the first mode comprising short-range wireless transmission;
     selecting a second mode of data transfer if the size is above the first threshold size and below a second threshold size, the second mode comprising long-range wireless transmission; and
     selecting a third mode of data transfer if the size is above the second threshold size, the third mode comprising wired transmission.

2. The information handling system of claim 1, wherein the processor is further configured to:
   determine a type of the digital asset to be migrated from the source system to the target system; and
   select the mode of data transfer from the source system to the target system for the digital asset further based on the type of the digital asset.

3. A computer-implemented method for opportunistic migration of digital assets, comprising:
   determining a size of a digital asset to be migrated from a source system to a target system; and
   selecting a mode of data transfer from the source system to the target system for the digital asset based on the size of the digital asset, wherein the mode is selected from a plurality of modes, and wherein the mode is selected by:
     selecting a first mode of data transfer if the size is below a first threshold size, the first mode comprising short-range wireless transmission;
     selecting a second mode of data transfer if the size is above the first threshold size and below a second threshold size, the second mode comprising long-range wireless transmission; and
     selecting a third mode of data transfer if the size is above the second threshold size, the third mode comprising wired transmission.

4. The method of claim 3, further comprising:
   determining a type of the digital asset to be migrated from the source system to the target system; and
   selecting the mode of data transfer from the source system to the target system for the digital asset further based on the type of the digital asset.

5. An article of manufacture comprising:
   a computer readable medium; and
   computer-executable instructions carried on the computer readable medium, the instructions readable by a processor, the instructions, when read and executed, for causing the processor to:
   determine a size of a digital asset to be migrated from a source system to a target system; and
   select a mode of data transfer from the source system to the target system for the digital asset based on the size of the digital asset, wherein the mode is selected from a plurality of modes, and wherein the mode is selected by:
     selecting a first mode of data transfer if the size is below a first threshold size, the first mode comprising short-range wireless transmission;
     selecting a second mode of data transfer if the size is above the first threshold size and below a second threshold size, the second mode comprising long-range wireless transmission; and
     selecting a third mode of data transfer if the size is above the second threshold size, the third mode comprising wired transmission.

6. The article of claim 5, the instructions for further causing the processor to:
   determine a type of the digital asset to be migrated from the source system to the target system; and
   select the mode of data transfer from the source system to the target system for the digital asset further based on the type of the digital asset.

* * * * *